United States Patent [19]

Gyorgy et al.

[11] Patent Number: 4,797,386

[45] Date of Patent: Jan. 10, 1989

[54] SUPERCONDUCTOR-MAGNET INDUCED SEPARATION

[75] Inventors: Ernst M. Gyorgy, Madison; Frances Hellman, Berkeley Heights; David W. Johnson, Jr., Pluckemin, all of N.J.

[73] Assignee: American Telephone and Telegraph Company, AT&T Bell Labs, Murray Hill, N.J.

[21] Appl. No.: 41,278

[22] Filed: Apr. 22, 1987

[51] Int. Cl.⁴ ............................................. H01F 7/22
[52] U.S. Cl. ........................................ 505/1; 335/216; 310/90.5
[58] Field of Search ................. 335/216; 310/90.5; 336/DIG. 1

[56] References Cited

U.S. PATENT DOCUMENTS

| | | | |
|---|---|---|---|
| 3,327,265 | 6/1967 | Geuns et al. | 335/216 |
| 3,378,315 | 4/1968 | Webb | 335/216 X |
| 3,589,300 | 6/1971 | Wipf | 335/216 X |

Primary Examiner—George Harris
Attorney, Agent, or Firm—George S. Indig

[57] ABSTRACT

Separation between a magnetized member and a Type II superconducting member inherently manifestets stability in separation distance, in lateral direction and in attitude. Uses include levitation of fixed and moveable members as well as superconducting bearings.

13 Claims, 1 Drawing Sheet

SUPERCONDUCTOR-MAGNET INDUCED SEPARATION

BACKGROUND OF THE INVENTION

Worldwide rebirth of interest in superconducting apparatus is traceable to discovery of high $T_c$ superconductors. In contrast to the ~20K. improvement in $T_c$ realized over the period from the discovery of superconductivity in 1911 to last year, superconductors introduced over the past few months have seen a rise in critical temperature through the 77 K. boiling point of liquid nitrogen and well into the 90–100 K. range. Based on anomalies in magnetic susceptibility and resistivity, both relative to changing temperature, evidence for superconductivity has been reported at temperatures as high as 240 K. (See J. T. Chen et al., "Observation of the Inverse dc Josephson Effect at 240 K.", to be published.) Copending U.S. application, Batlogg-Cava-VanDover 2-4-7, Ser. No. 021,229, filed Mar. 3, 1987, describes and claims the generic chase of materials to which work has generally been directed. Chemically, the category is described by the nominal formula $M_2M'Cu_3O_{9-\delta}$. The detailed requirements of members of the class are set forth in the copending application. Much of the work reported is based on material of the approximate composition $Ba_2YCu_3O_7$ sometimes referred to simply as barium-yttrium-copper oxide.

While many structures and processing utilizing superconductivity have been described in the literature, over the years prevalent use has awaited critical temperatures high enough for expedient cooling. Now that liquid nitrogen cooling is a reality attention is being refocussed on these uses. The present invention is directed to structures and processes which depend on separation brought about by coupling of a superconducting member and a magnetic member. While the concerned apparatus may be static by nature, other forms involve one or more moving elements.

One type of apparatus that has received considerable attention depends upon levitation. A variety of such applications are described in "Superconducting Machines and Devices—Large Systems Applications."

Another such application takes the form of a superconducting bearing (see Applied Superconductivity, Vol. II).

Levitation demonstrations at liquid nitrogen temperatures began appearing shortly after announcement of the new high $T_c$ materials. A demonstration that received considerable attention in the press takes the form of a cup-shaped superconducting member suspending a small permanent magnet (see Physics Today, April, '87, cover). Such demonstrations have, consistent with earliest work, depended upon geometric shapes or other means designed for lateral stabilization. The cup walls represent a typical geometric design intended to offer lateral constraint for this purpose.

SUMMARY OF THE INVENTION

The invention is directed to superconductivity-magnetic induced separation in which a need for geometry and/or ancillary elements for lateral stabilization are avoided. (The term "lateral", as used in this description, has general reference to directions orthogonal to the direction of separation.) In a simple preferred form, separation depends upon coupled superconductor-magnetic pairs, using a simple planar (or even inverted cup) superconducting member.

Superconducting elements in accordance with the invention are made of "Type II" materials. These are characterized by first and second values of critical field, $H_{c,1}$ and $H_{c,2}$—in which field penetration first occurs at the lowest value ($H_{c,1}$) to result in pinned fields which persist to the much higher $H_{c,2}$ levels (see M. Tinkham, Introduction to Superconductivity, Chapter 5, pg. 143 McGraw-Hill, Inc. 1975.) Conditions under which the invention may be practiced require selective attainment of $H_{c,1}$ value so as to produce one or more isolated regions within the superconductor in which there is a magnetic field penetration.

Lateral stabilzation depends upon the fact that lateral shift of the suspended member relative to the supporting member requires field penetration in the superconductor in the direction of shift. This mechanism results in resistance to lateral movement and, therefore, in lateral stabilization for any position at which equilibrium may be attained. Relative positioning, once stabilized, may be adjusted to any desired position with application of sufficient force to overcome the stabilizing influence, and the new position will be stable in turn. Note, however, Example 4 in which it was found that overcoming the stabilizing influence required excess movement (temporary attainment of spacing closer than the new stabilized positions).

The feature of self-stabilization at any of a variety of positions may be of value in releasing design/machining requirements, or may serve a specific function during operation.

BRIEF DESCRIPTION OF THE DRAWING

FIG. 1 depicts magnet 1 with its north and south poles 2 and 3 disposed longitudinally as shown. As depicted, magnet 1 is levitated over superconducting support body 4 which is made of a Type II superconductor, for example, of the barium-yttrium copper oxide composition. The magnetic properties of body 1 and the characteristics of body 4 are such that the value of $H_{c,1}$ is exceeded in body 4 by the field of magnet 1 to introduce vortices 5 and 6. Maximum separation between magnet 1 and superconducting body 4 is dependent upon both the properties of the bodies and other conditions (such as weight, displacing forces, etc.). In Examples 1 and 2, spacings of from 0 to 6 millimeters were realized.

The inventive teaching is based primarily upon the stabilizing influence of vortices such as 5 and 6. Movement or change in size requires energy so that lateral stabilization (as well as attituding and space stabilization) of magnet 1 result. In the inverted form, considerations are identical.

Figure 1:
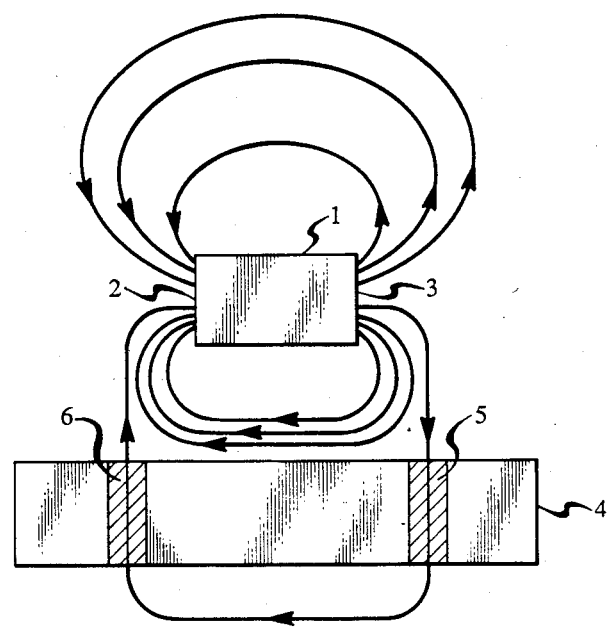
FIG. 1 is a schematic plan view of a magnet as levitated by a Type II superconductor in accordance with the invention and is used as well to represent a superconductor levitated by a magnet.
Figure 2:
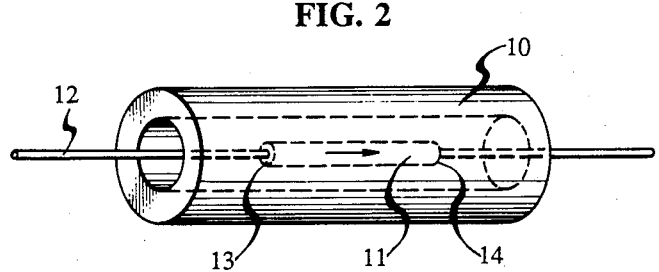
FIG. 2 is a perspective view of a superconducting bearing of a design in accordance with the invention. cl DETAILED DESCRIPTION FIG. 1 included primarily for the purpose of describing the essential mechanism of the invention, schematically represents separation apparatus in general. The FIG. may be viewed, as depicted, with the magnet levitated, or as inverted, with the superconductor levitated.

FIG. 2 depicts a superconducting bearing. The particular design depicted includes a tubular superconducting body 10 within which a magnetic member 11 is caused to rotate through rotation means not shown attached to shaft 12. The magnet member 11 is magnetized axially as shown by the arrow so as to result in poles 13 and 14. As rotated, field concentrated at poles 13 and 14 and chosen to locally exceed the critical field value $H_{c,1}$ of the superconducting member 10, results in field penetration within a ring-shaped region defined by the projection of the high field region produced by poles 13 and 14. Resulting stabilization prevents unwanted longitudinal displacement of the magnetic member 11 (the armature), relative to member 10 thereby avoiding the need for any restraining members.

To a considerable extent, the attitude of the configuration shown may be varied. It is not required that the bearing be maintained in the horizontal position shown since the responsible forces tend to stabilize the armature in any position. Depending upon the magnitude of the levitation and stabilizing forces (as well as those induced by ancillary driving or driven equipment), the bearing will operate at any oblique angle as well as vertically.

Design variants on FIG. 2 includes structures in which the superconducting element may not be a simple tube, but e.g. may be a cavity which is of reduced diameter at one or both extremities.

Embodiments of the invention depend upon superconductor-magnet couples in which the superconductor is Type II, and in which utilization is under conditions such that field penetration resulting from exceeding $H_{c,1}$ values in one or more regions, each of which is at least partially surrounded by superconducting material which is unpenetrated by magnetic field (in which magnetic field is less than $H_{c,1}$). Stabilization may be realized for any of a large variety of spacing and attitudes. Stability favored by disc spacing, by both poles interacting and by $H_{c,1}$ penetrated regions being surrounded by normal material more nearly completely. The magnetic element(s) may depend for its field on permanent magnetic properties or may be magnetized by flowing current or other means.

The invention takes the form of configurations, sizes, spacings, and attitudes made possible by the inherent lateral stabilization realized as a consequence of the above conditions. A preferred category represents departure from the usual cup-shaped superconducting member thought to be necessary for stability. In accordance with the invention, this element may be a planar—a simple flat disc—or even of inverted regular or irregular cup shape.

A preferred category depends upon the relative size of the paired members. In the usual case, to permit maximum stability, and in a still more preferred case, to permit adjustable positioning, the superconducting member should be larger than the dipole separation of the magnet (or than the separation of the poles as projected on the superconducting member). In addition, since the invention does not depend on lateral stabilization produced by cup walls or other such field shaping, the invention permits asymmetric placement of one element relative to another.

Superconducting Material Requirements

The basic requirement for the superconducting member is that of Type II superconductivity. Implicit characteristics must be such as to permit requisite separation force, as well as positioning and this, in turn, dependent upon values $H_{c,1}$ and $H_{c,2}$ as related to the magnet. Such considerations are adequately described in terms of the intended function which requires a separation force necessary to offset any opposing force. The force requirement for separation is apparent—to prevent collapse under whatever conditions are implicit in the application. For superconducting bearings, or simple levitation, the requirements may be stated in the same general terms—e.g. separation force must be sufficient to prevent collapse.

There is, of course, a preference for high $T_c$ materials. Initial use is expected to benefit by the perovskite materials, for example, of the barium-yttrium copper oxide class which permit use of liquid nitrogen cooling.

Other materials, for example $Nb_3Sn$ (A-15) category, may be emloyed, although $T_c$ values do not permit liquid nitrogen cooling. Higher $T_c$ materials such as described by workers at Wayne State (J. T. Chen et al., "Observation of the Inverse dc Josephson Effect at 240 K.", to be published) may be employed. Identification of room temperature superconductivity would further increase the value of the invention.

Equipment requirements are specific to the particular use. Cooling means, as required by the particular superconductor employed, may simply take the form of a container of refrigerant in which the superconducting element is immersed. Other power requirements may arise e.g. from use of an electromagnetic element as one of the separated elements.

Description is largely in terms of the lateral stability which is inherent in Type II superconductivity under conditions noted. In fact vertical stability at any of various spacings as well as attitudes is, at least in part a consequence of Type II superconductivity as well (a consequence of the energy variation implicit in changing the size as well as position of penetrated regions).

EXAMPLES

The following examples are chosen to demonstrate inherent lateral stability, as well as positioning:

1. The support, in this instance, a superconducting body of barium-yttrium-copper oxide, is a flat disc of approximate dimensions, 1.25" diameter and 0.25" thickness. It was cooled to liquid nitrogen temperature. The magnetic member was a neodymium iron boron cubicle 0.67 cm on each side.

The properties of the permanent magnet were:

Saturation moment—12.8 KGauss in the direction of one of the cube axes.

Coercive force—12 $KO_e$.

The magnetic member was brought into position with its dipole parallel to the support member surface and positioned at a variety of spacings from the superconducting element. The cube was successively positioned at 1, 2, 3, 4, 5 and 6 mm and, in each position, was levitated and resisted lateral displacement.

2. The same apparatus of Example 1 was utilized with the cube at a variety of positions (off-center) relative to the support disc. The cube was also cocked so that the projected spacing of the poles on the superconducting member was reduced. In each instance, the separation was in the range 1–6 mm. Upon release, the cube was found to be stably levitated in the attitude, at the spacing, and in the position placed relative to the supporting member.

3. The apparatus of Example 1 was again used. In this example, the initial temperature of the superconducting body was above $T_c$ and the cube rested in contact with the superconducting body. The temperature was reduced by immersion in liquid nitrogen to result in levitation of the cube to a stable position spaced approximately three millimeters above the superconductor. Laterally, there was no shift between unlevitated and levitated state.

4. Using the same apparatus but again as maintained below $T_c$, the cube was stabilized at a variety of height (decreasing separation required initially closer spacing). In each instance it was found that a given levitational position of stability required initial movement in the direction of levitational change which exceeded the differential height.

5. Using the apparatus and temperature of Example 4, lateral positioning was altered by lateral shift but also required reducing separation distance to an experimentally determined minimal spacing (in the instance about three millimeters).

Additional Considerations

The position stability on which the invention is based has other implications. For example, the very stability opposes any motion which implicitly results in positive and/or increased size of field-penetrated regions within the superconductor. Implications, inherent in the instance of FIG. 2, have to do with variation in $H_{c,1}$ value (e.g. by appropriate choice of composition) as well as "pre-penetration" by ancillary magnets. For example, energy required to move a separated member may be increased or decreased by changing the direction as well as area of penetrated region(s).

What is claimed is:

1. Apparatus comprising separated elements, separation of which is induced by force comprising magnetic-superconducting repulsion, in which, in the operating state one such element is superconducting and a second such element is magnetized, characterized in that the said superconducting element consists essentially of a Type II superconductor, and the properties and relative position of the elements are such that, in operation, the lower field value $H_{c,1}$ of the superconducting element is exceeded by a field produced by the magnetized element so as to result in magnetic field penetration within the superconducting element within at least one region which is at least partially surrounded by superconducting regions which are not field-penetrated, whereby lateral stabilization of the said relative position is at least in part due to the fact that lateral shift requires field penetration in the direction of shift.

2. Apparatus of claim 1 in which the said relative positions are such as to result in at least two such regions.

3. Apparatus of claim 1 in which a said element is levitated.

4. Apparatus of claim 3 in which the levitated element is magnetic.

5. Apparatus of claim 4 in which the levitated element is a permanent magnet.

6. Apparatus of claim 3 in which another said element is essentially planar.

7. Apparatus of claim 1 in which a separated element is moved relative to another in the operating state.

8. Apparatus of claim 7 in which the movement consists of axial rotation.

9. Apparatus of claim 8 in which an element has a longitudinal aperture within which a second element is disposed.

10. Apparatus of claim 9 in which the disposed element is magnetic.

11. Superconducting bearing comprising a fixed casing member enclosing a rotable member the first such member being a superconductor and the second being magnetizable, in which in operation the second member is magnetized with its dipole in the direction of the axis of rotation, characterized in that the superconducting member is a Type II superconductor and in that the field to which the superconducting member is subjected by the magnetic member exceeds the lower critical field $H_{c,1}$ of the said superconducting member within two regions separated in a direction generally parallel to the axis of rotation, so that in operation, regions of field penetration are produced within the said superconducting member, whereby lateral stabilization of the relative positions of the first and second members is at least in part due to the fact that lateral shift requires field penetration in the direction of shift.

12. Bearing of claim 11 in which the rotable member is a superconductor and in which the casing member is magnetizable.

13. Bearing of claim 12 in which the rotatable member is magnetizable and the casing member is superconducting.

* * * * *